June 30, 1936. E. J. L. F. CONSTANTIN 2,045,757
SCREW CONVEYER
Filed June 27, 1935
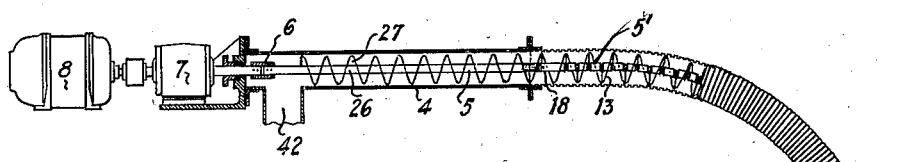
Fig. 1
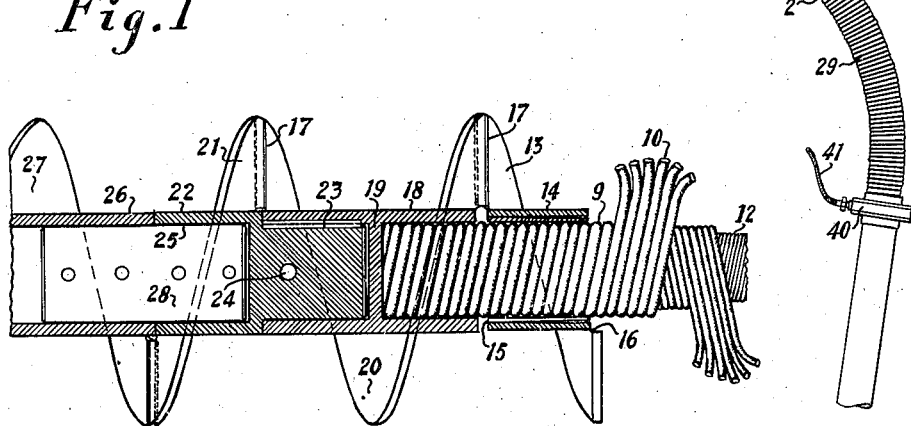
Fig. 2
Fig. 3
Fig. 4
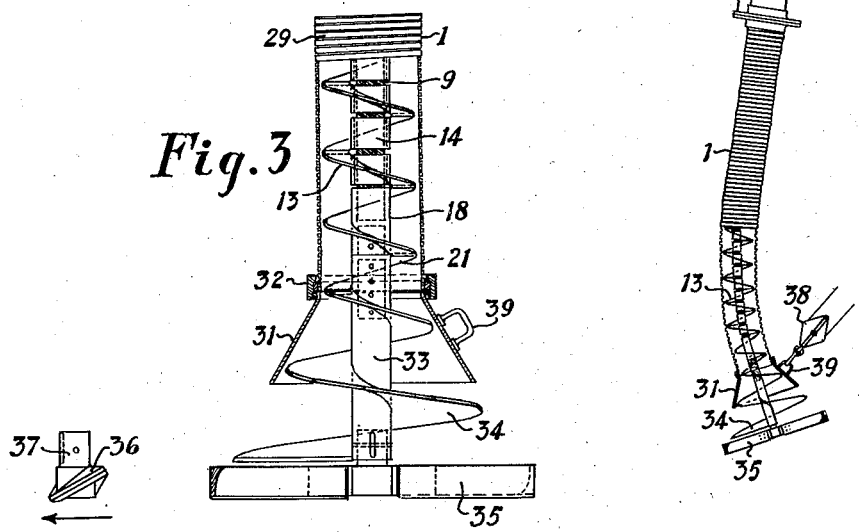
INVENTOR
E. J. L. F. CONSTANTIN
BY
ATTORNEYS Patented June 30, 1936

2,045,757

UNITED STATES PATENT OFFICE 2,045,757

SCREW CONVEYER

Eusebe J. L. F. Constantin, Paris, France, assignor to Fuller Company, a corporation of Delaware Application June 27, 1935, Serial No. 28,605
In France July 9, 1934

7 Claims. (Cl. 198—213)

This invention relates to screw conveyers and more particularly to a flexible conveyer for handling pulverulent or granular materials, and is especially concerned with conveyer elements of sufficient flexibility to permit the conveying of materials around bends of short radii.

This apparatus is of general utility for conveying where one or more changes in direction are necessary, and its primary purpose is to recover material from open storage, as in unloading vessels, cars and trucks. It is a further purpose of the invention to provide a conveyer capable of transportiong materials through at least one change in direction, in which the conveyer elements form a continuous conveyer, throughout the length of the system, requiring but one drive mechanism.

In general, the apparatus comprises flexible sections including flexible shafting which carries separate worm or flight sections. To provide for adequate flexibility each flight section of the flexible portions of the system should preferably be one-half flight, that is, one-half of a convolution, each section being welded to a sleeve secured to the shaft, the flight surfaces extending beyond the opposite ends of the sleeves a short distance whereby a space will be provided between adjacent sleeves to permit bending of the shafting. The meeting edges of adjacent flights are spaced only a sufficient distance to permit the requisite play or relative movement to provide for the desired flexibility but for the practical purposes of conveying the sections form a substantially continuous conveyer flight. The sleeves may be secured to the shafting by welding, but I prefer to force them over a split bushing tapered to provide a tight fit, as this arrangement permits bending of the conveyer to a shorter radius.

If the change in the direction of material flow is permanent or fixed, the elements above described may be supported or arranged centrally within a rigid pipe bend of the desired curvature, but where flexibility of the entire conveyer is necessary, as in recovering materials from storage piles the casing preferably comprises a flexible metallic conduit such as articulated steel hose of conventional type. For economy in manufacture, I prefer to employ rigid sections where material is to be moved in a straight line, such sections comprising a casing of ordinary steel pipe and rigid shafting, usually hollow, carrying continuous flights. The various flexible and rigid sections are suitably coupled to provide a continuous system, driven by a suitable motor and speed reducer of conventional type connected to the terminal section.

To economize in power consumption and to minimize wear of the working parts, I prefer to inject a small volume of compressed air into the system especially to prevent the material from compacting in the bends of the system, the air so injected having no function in conveying other than to render the material sufficiently fluent. When air is employed however, it should be injected at a point far enough beyond the inlet to the system to prevent excessive aeration at the source of supply which would impair the efficiency of the conveyer due to slippage of the material on the flights of the screw.

In order to obtain large capacities, particularly when material is initially to be elevated, I have found it desirable to employ a feeding arrangement preferably in the form of a conical conveyer section comprising a screw section having flights of increasing diameter toward the inlet and having approximately one complete flight extending beyond a conical casing which is secured to the conveyer pipes line or conduit. For elevating material from storage piles, an agitator is preferably secured to the feeder shaft, the agitator being preferably a rotary plow having inclined surfaces, of slightly greater span than the diameter of the terminal flight, whereby the material will be under-mined and will flow by gravity toward the feeder.

The apparatus will be described, for simplicity, with relation to an arrangement for unloading Portland cement from barges, although it is of more general utility, and reference is made to the accompanying drawing in which:

Fig. 1 is a general arrangement, partly in section, of a complete system,

Fig. 2 is a detail, partly in section, of adjacent rigid and flexible sections,

Fig. 3 is an elevation of the feeder, partly in section, and

Fig. 4 is an end elevation of the agitator.

By reference to the drawing, and first to Fig. 1, the apparatus will be seen to comprise flexible sections 1 and 2, and rigid sections 3 and 4. Rigid and flexible screw conveyer elements 5 and 5', respectively, are arranged centrally within these sections and are suitably coupled, as will be explained more fully hereinafter, to form a continuous conveyer system, the shafting being flexibly coupled as at 6 to the driven shaft of a speed reducer 7 connected to the usual driving motor 8.

As will appear more clearly in Figs. 2 and 3, the flexible sections comprise a flexible shaft 9 formed of preferably 8 to 10 layers of closely wound piano wire, the layers having preferably six strands as indicated at 10 with adjacent layers wound in opposite directions as shown at 11 and 12. I have found that a shaft of this type is sufficiently flexible for the purposes described and that the torque required for driving the conveyer elements will not result in apparent elongation of the shaft even after severe usage.

The conveyer elements preferably comprise separate worm or flight sections 13, preferably half flights, or half a convolution, to provide for a maximum of flexibility. The flight sections 13 are welded to sleeves 14 and the latter are preferably secured to the shaft 9 by driving them over a tapered bushing split as indicated at 15, the bushing serving to grip the outer strands of the shaft 9. As will be seen more clearly in Fig. 2, the flight surfaces 13 extend slightly beyond the opposite ends of the sleeves 14 as shown at 16 whereby adjacent sleeves 14 will be spaced a sufficient distance to permit the desired flexing of the shaft. The meeting edges of adjacent flights 13 are spaced a minimum distance as shown at 17 to permit the necessary play or angular relative movement, but form a substantially continuous flight surface.

For economy in manufacture and to facilitate repair and replacement, I have found that the flexible shaft 9 should comprise short lengths up to 9 feet, and preferably somewhat shorter. The ends of these lengths may be coupled by a hollow sleeve 18, having a central seat 19, an end of a length of shaft being inserted and securely welded to the sleeve. The sleeve preferably carries a complete flight 20 which terminates adjacent to a flight 21 carried by a coupling 22 having a projection 23 of reduced diameter which is secured within the sleeve 18 as by a rivet pin 24. The coupling 22 has a central bore 25 to receive either the end of another length of flexible shafting 9, or a cylindrical coupling pin 28 to secure a hollow rigid screw shaft 26, which carries continuous flights 27, the shaft being secured to the coupling pin by suitable rivet pins.

In the conveyer sections 1 and 2, the flexible shafting 9 and its separate flight sections 13 are arranged centrally within flexible piping 29, formed of metallic hose of conventional type. The rigid conveyer elements, comprising the shafting 26 and continuous flights 27 are encased in ordinary steel pipe in the conveyor sections 3 and 4, for the sake of economy in construction, the steel pipe and flexible hoses being suitably coupled as by means of companion flanges 30. It will be understood, however, that when a change in direction of material flow is to be constant, that a rigid steel pipe bend of the desired curvature may be substituted for a section of metallic hose 29. In order to obtain a high capacity in the transfer of material, particularly where the latter is to be initially elevated, I provide a feeder shown in detail in Fig. 3, which comprises a conical casing 31 secured as at 32 to the inlet of flexible section 1. Arranged centrally within this casing is a shaft 33 coupled to the shaft 9 by a sleeve 18, in an arrangement identical to that shown in Fig. 2. The shaft 33 carries continuous flights 34 of progressively increasing diameter, approximately one complete flight section extending beyond the lower end of the conical casing 31, the arrangement serving to advance a maximum quantity of cement into the flexible piping 29.

In order to accelerate the flow of cement by gravity to the flights 34, I provide an agitator or rotary plow 35 of a length slightly greater than the diameter of the terminal flight, the plow having oppositely arranged inclined lifting surfaces 36 as indicated in Fig. 4, and a shaft 37 which may be inserted in and secured to the shaft 33 as by means of a rivet pin. Oscillation of the feeder and flexible section 1, due to the effect of the torque of the flexible conveyer elements, may conveniently be restrained by securing an element of a hoist, as indicated by the block 38, to a U-bolt 39 secured to the casing 31, the hoist further serving to swing the flexible section through the desired arcs to permit complete recovery of the material.

As materials such as Portland cement tend to compact when resistance to flow is encountered, I have found that the materials will continue to flow readily if a small volume of compressed air is injected into the system in advance of points where resistance may be anticipated, as in the curved flexible section 2. I therefore provide an injector 40 which may be of any conventional type but preferably provided with a circular series of small discharge orifices to provide for uniform aeration. Compressed air may be supplied from any suitable source through a flexible hose indicated at 41. The air so injected should be of small volume as it has no function in conveying other than to maintain a fluent material condition, whereby the material may be moved through the entire system without excessive power consumption or wear of the working parts.

As will be apparent from the foregoing, I have provided a conveyer arrangement comprising a continuous series of flexible and rigid sections which may be joined and arranged in any desired manner to provide a continuous system, requiring only one driving mechanism, such as the speed reducer 7 and motor 8, the driving mechanism being preferably arranged just beyond the discharge spout 42 of the system.

The operation of the apparatus will be apparent from the foregoing, but for a better understanding of the relation of parts and their operation, I have found that flexible sections up to 33' in length operate satisfactorily, without material wear after six months of continuous service, and indicate that sections of greater length are feasible. A conveyer of this length having a casing of 5.8" internal diameter with screw flights of 5.7" diameter and 4¼" pitch has a continuous capacity of 11 tons of Portland cement an hour when driven at a speed of 190 R. P. M. and involves a total power consumption ranging between 2.29 and 2.55 kw.

I claim:

1. A conveyer for pulverulent materials comprising the combination of a casing, a flexible driven shaft arranged within the casing, spaced sleeves secured to the shaft, a flight section of one half a convolution secured to each sleeve and having a flight surface extending beyond the opposite ends of each sleeve, the adjacent flight sections having meeting edges slightly spaced to permit relative movement of said sections, the flight sections forming a substantially continuous conveyer flight.

2. A conveyer for pulverulent materials comprising the combination of a casing, a flexible driven shaft arranged within the casing, spaced sleeves arranged on the shaft, a tapered split bushing for securing each of said sleeves to the shaft, a flight section secured to each sleeve and having a flight surface extending beyond the opposite ends of each sleeve, the adjacent flight sections having meeting edges slightly spaced to permit relative movement of said sections, the flight sections forming a substantially continuous conveyer flight.

3. A conveyer for pulverulent materials comprising the combination of a casing, a flexible driven shaft formed of a plurality of layers of wire, each layer including a plurality of strands, the adjacent layers being wound in opposite directions, spaced sleeves secured to the shaft, a flight section secured to each sleeve and having a flight surface extending beyond the opposite ends of the sleeve, the adjacent flight sections having meeting edges slightly spaced to permit relative movement of said sections, the flight sections forming a substantially continuous conveyer flight.

4. A flexible conveyer for pulverulent materials comprising the combination of a flexible conduit, a flexible driven shaft arranged centrally within the conduit, spaced sleeves secured to the shaft, a flight section secured to each sleeve and having a flight surface extending beyond the opposite ends of the sleeve, the adjacent flight sections having meeting edges slightly spaced to permit relative movement of said sections, the flight sections forming a substantially continuous conveyer flight.

5. A conveyer for pulverulent materials comprising the combination of a casing, a flexible driven shaft arranged within the casing, spaced sleeves secured to the shaft, a flight section secured to each sleeve and having a flight surface extending beyond the opposite ends of the sleeve, the adjacent flight sections having meeting edges slightly spaced to permit relative movement of said sections, the flight sections forming a substantially continuous conveyer flight, and means to inject compressed air into the casing to render the material fluent.

6. A flexible conveyer for pulverulent materials comprising the combination of a flexible conduit, a flexible driven shaft arranged centrally within the conduit, spaced sleeves secured to the shaft, a flight section secured to each sleeve and having a flight surface extending beyond the opposite ends of the sleeve, the adjacent flight sections having meeting edges slightly spaced to permit relative movement of said sections, the flight sections forming a substantially continuous conveyer flight, and a feeder for delivering material to said flight sections, comprising a shaft, screw flights of progressively increasing diameter secured to said shaft, the shaft being secured to the flexible shaft to rotate with it, the upper end of the feeder being partially enclosed by a conical casing.

7. A conveyer for pulverulent materials comprising the combination of a casing, a screw shaft formed of a plurality of sections at least one of which is flexible, spaced sleeves secured to said flexible section, a flight section secured to each sleeve and having flight surfaces extending beyond the opposite ends of the sleeve, the adjacent flight sections having meeting edges slightly spaced to permit relative movement of said sections, the shaft sections being connected by a coupling including a sleeve to receive adjacent ends of shaft sections, the sleeve being provided with a similar flight section to form a substantially continuous conveyer flight.

EUSEBE J. L. F. CONSTANTIN.